(12) United States Patent
Kim et al.

(10) Patent No.: US 8,451,256 B2
(45) Date of Patent: May 28, 2013

(54) DC-DC CONVERTER, LIQUID CRYSTAL DISPLAY DEVICE, AGING TEST APPARATUS OF LIQUID CRYSTAL DISPLAY DEVICE, AND METHOD THEREOF

(75) Inventors: Dae Seop Kim, Anseong-si (KR); Seok-Hyun Jung, Asan-Si (KR); Jae Jin Choi, Seoul (KR)

(73) Assignee: Samsung Display Co., Ltd. (KR)

( * ) Notice: Subject to any disclaimer, the term of this patent is extended or adjusted under 35 U.S.C. 154(b) by 1067 days.

(21) Appl. No.: 11/836,202

(22) Filed: Aug. 9, 2007

(65) Prior Publication Data

US 2008/0088550 A1   Apr. 17, 2008

(30) Foreign Application Priority Data

Oct. 17, 2006  (KR) .......................... 10-2006-0100763

(51) Int. Cl.
  *G09G 5/00* (2006.01)
(52) U.S. Cl.
  USPC ........... 345/204; 345/102; 345/211; 345/100; 345/77; 345/691; 323/301; 362/97.2
(58) Field of Classification Search
  USPC ............... 345/102, 204–212, 99, 100, 76–77, 345/82, 691; 315/291–307; 323/222–299; 363/17–89; 362/97.1–97.3
  See application file for complete search history.

(56) References Cited

U.S. PATENT DOCUMENTS

| | | | | |
|---|---|---|---|---|
| 7,307,614 B2 * | 12/2007 | Vinn | ............................... | 345/102 |
| 7,764,022 B2 * | 7/2010 | Ogura et al. | ................... | 315/291 |
| 2003/0058235 A1 * | 3/2003 | Moon | ........................... | 345/212 |
| 2003/0122814 A1 * | 7/2003 | Yer | ............................... | 345/211 |
| 2003/0214478 A1 * | 11/2003 | Yoo et al. | ....................... | 345/102 |
| 2004/0145584 A1 * | 7/2004 | Lee et al. | ....................... | 345/212 |
| 2005/0078065 A1 * | 4/2005 | Hayafuji et al. | ................ | 345/76 |
| 2006/0170373 A1 * | 8/2006 | Yang | ........................ | 315/209 R |
| 2007/0080924 A1 * | 4/2007 | Shin | ............................... | 345/102 |
| 2007/0273681 A1 * | 11/2007 | Mayell | ........................... | 345/211 |

FOREIGN PATENT DOCUMENTS

| KR | 1020030058756 A | 7/2003 |
|---|---|---|
| KR | 1020040021846 A | 3/2004 |

* cited by examiner

*Primary Examiner* — Lun-Yi Lao
*Assistant Examiner* — Gregory J Tryder
(74) *Attorney, Agent, or Firm* — Cantor Colburn LLP

(57) ABSTRACT

A gate-on voltage/LED driving voltage generator includes an inductor boosting an input voltage through a PWM voltage and the input voltage, a diode and capacitor rectifying the boosted voltage, a first output terminal outputting the rectified voltage to supply an LED driving voltage to an LED, and a second output terminal supplying the rectified voltage to a gate driving circuit. Further, an aging test apparatus of an LCD device, which includes a high LED driving voltage generator in an HVS power board, and an HVI power board, may selectively perform an aging test according to a backlight unit of the LCD. Further, a DC-DC converter having the gate-on voltage/LED driving voltage generator, and the LCD including the DC-DC converter are provided.

8 Claims, 9 Drawing Sheets

DC-DC CONVERTER, LIQUID CRYSTAL DISPLAY DEVICE, AGING TEST APPARATUS OF LIQUID CRYSTAL DISPLAY DEVICE, AND METHOD THEREOF

This application claims priority to Korean Patent Application No. 2006-100763, filed Oct. 17, 2006, and all the benefits accruing therefrom under 35 U.S.C. §119, the contents of which in its entirety are herein incorporated by reference.

BACKGROUND OF THE INVENTION (a) Field of the Invention

The present invention relates to a direct current ("DC")-DC converter including a gate-on voltage/light emitting diode ("LED") driving voltage generator, and a liquid crystal display ("LCD") device having the gate-on voltage/light emitting diode ("LED") driving voltage generator. More particularly, the present invention relates to a DC-DC converter including a gate-on voltage/LED driving voltage generator which provides a driving voltage for an LED and a gate-on voltage driving a gate line, and an LCD device having the gate-on voltage/LED driving voltage generator.

Further, the present invention relates to an aging test apparatus of the LCD device and a method thereof. More specifically, the present invention relates to an aging test apparatus of the LCD device capable of performing an aging test according to a backlight unit of the LCD device, and a method of testing the LCD device using the aging test apparatus.

(b) Description of the Related Art

Generally, LCD devices have been widely used in a broad range of applications due to the characteristics such as light-weight structure, slim profile, low power-consumption, etc. The LCD devices display an image by applying an electric field to a liquid crystal material which has an anisotropic dielectric constant and is disposed between two substrates and adjusting an amount of light which is transmitted to the substrates by controlling the strength of the electric field.

The LCD device includes an LCD panel, a panel driver driving the LCD panel, and a DC-DC converter supplying a driving voltage to the panel driver. Since the LCD panel is a non-light emitting element which may not emit light by itself, the LCDs need a backlight unit supplying light to the LCD panel.

LEDs used as a backlight unit have a long lifespan and fast lighting speeds compared to cold cathode fluorescent lamps ("CCFLs"), etc. and the characteristics of low power-consumption and strong impact resistance. Further, the LEDs have the advantages of miniaturization and light-weight structure.

The LCD devices using the LEDs as a backlight unit must have an additional driving circuit which supplies a driving voltage to the LEDs. The driving circuit which drives the LEDs is separately formed in a DC-DC converter or on a circuit substrate. Accordingly, a further driving circuit which drives the LEDs is necessary, and thus raises costs of the LCDs.

The LCDs take an aging test after a final manufacturing process. Herein, the aging test is a process which puts the LCDs within an aging test driving apparatus, tests properties and reliability of the LCDs while varying temperature and humidity, and stabilizes performance of the LCDs.

Recently, the aging test further includes a high voltage stress ("HVS") driving method which applies a driving voltage higher than a normal driving voltage to the LCDs. The HVS driving method applies to the LCDs a voltage higher than a plurality of voltages (e.g. a driving voltage, an analog driving voltage, a turn-on/turn-off voltage of a thin film transistor ("TFT"), an inverter driving voltage) necessary for driving the LCDs, and gives stress to the LCDs. The HVS driving method may improve the ability of detecting line defects of the LCDs which may open a circuit according to a voltage level applied by the HVS driving method. Further, the HVS driving method may remarkably reduce an aging time and improve productivity of the LCDs.

The HVS driving method needs a high voltage stress for inverter ("HVI") power board for driving an HVS power board and a lamp. However, when using the LEDs as the backlight unit for the LCDs, an HVS driving method for the LEDs is needed.

BRIEF SUMMARY OF THE INVENTION

The present invention provides a DC-DC converter including a gate-on voltage/LED driving voltage generator which generates a gate-on voltage and an LED driving voltage in one circuit, and an LCD device having the gate-on voltage/LED driving voltage generator.

Further, the present invention provides an aging test apparatus for the LCD device which includes a high LED driving voltage generator in an HVS power board so as to selectively supply a voltage to a lamp or an LED used as a backlight unit for the LCD, and an HVI power board.

Exemplary embodiments of the present invention provide a DC-DC converter including a gate-on voltage/LED driving voltage generator including an inductor which boosts a first input voltage through a pulse width modulation voltage and the first input voltage, a first diode and a capacitor which rectify the voltage boosted in the inductor to provide a rectified voltage, a first output terminal which outputs the rectified voltage from the first diode and the capacitor to supply an LED driving voltage to an LED, and a second output terminal divided from the first output terminal to supply the rectified voltage to a gate driving circuit.

Other exemplary embodiments of the present invention provide an LCD device including an LCD panel which displays an image, a gate driving circuit and a data driving circuit which drive the LCD panel, a timing controller which supplies a pixel data signal to the data driving circuit, and supplies a control signal to the gate driving circuit and the data driving circuit, a common voltage/gamma voltage generator which generates a gamma voltage supplied to the data driving circuit and a common voltage supplied to the LCD panel, an LED which supplies light to the LCD panel, and a DC-DC converter including a gate-on voltage/LED driving voltage generator which simultaneously generates an LED driving voltage and a gate-on voltage supplied to the LED and the gate driving circuit, respectively, a gate-off voltage generator which generates a gate-off voltage supplied to the gate driving circuit, and an analog voltage generator which generates an analog voltage supplied to the common voltage/gamma voltage generator.

Still other exemplary embodiments of the present invention provide an aging test apparatus of an LCD device including a low voltage differential signaling interface which receives an image data signal, a control signal, and a driving signal supplied from an external circuit, a high voltage stress power board which includes a high stress driving voltage generator generating a high stress driving voltage through the control signal and the driving signal supplied through the low voltage differential signaling interface and a high LED driving voltage generator generating a high LED driving voltage, and a high inverter driving voltage power board which generates a high inverter driving voltage to be supplied to an inverter of the LCD device, wherein the high LED driving voltage generator or the high inverter driving voltage power board are selectively driven according to a backlight unit of the LCD device.

Other exemplary embodiments of the present invention provide a method of testing an LCD device using an aging test apparatus, the aging test apparatus including a high voltage stress power board and a high inverter driving voltage power board, the high voltage stress power board including a high stress driving voltage generator and a high LED driving voltage generator, the method including determining a type of backlight unit used in the LCD device, selectively operating the high LED driving voltage generator to supply a high LED driving voltage to the LCD device when the backlight unit includes an LED, and selectively operating the high inverter driving voltage power board to supply a high inverter driving voltage to an inverter of the LCD device when the backlight unit includes a lamp that is not an LED.

BRIEF DESCRIPTION OF THE DRAWINGS

The above and other aspects, features and advantages of the present invention will become readily apparent by reference to the following detailed description in conjunction with the accompanying drawings, wherein.

DETAILED DESCRIPTION OF THE INVENTION

Figure 1:
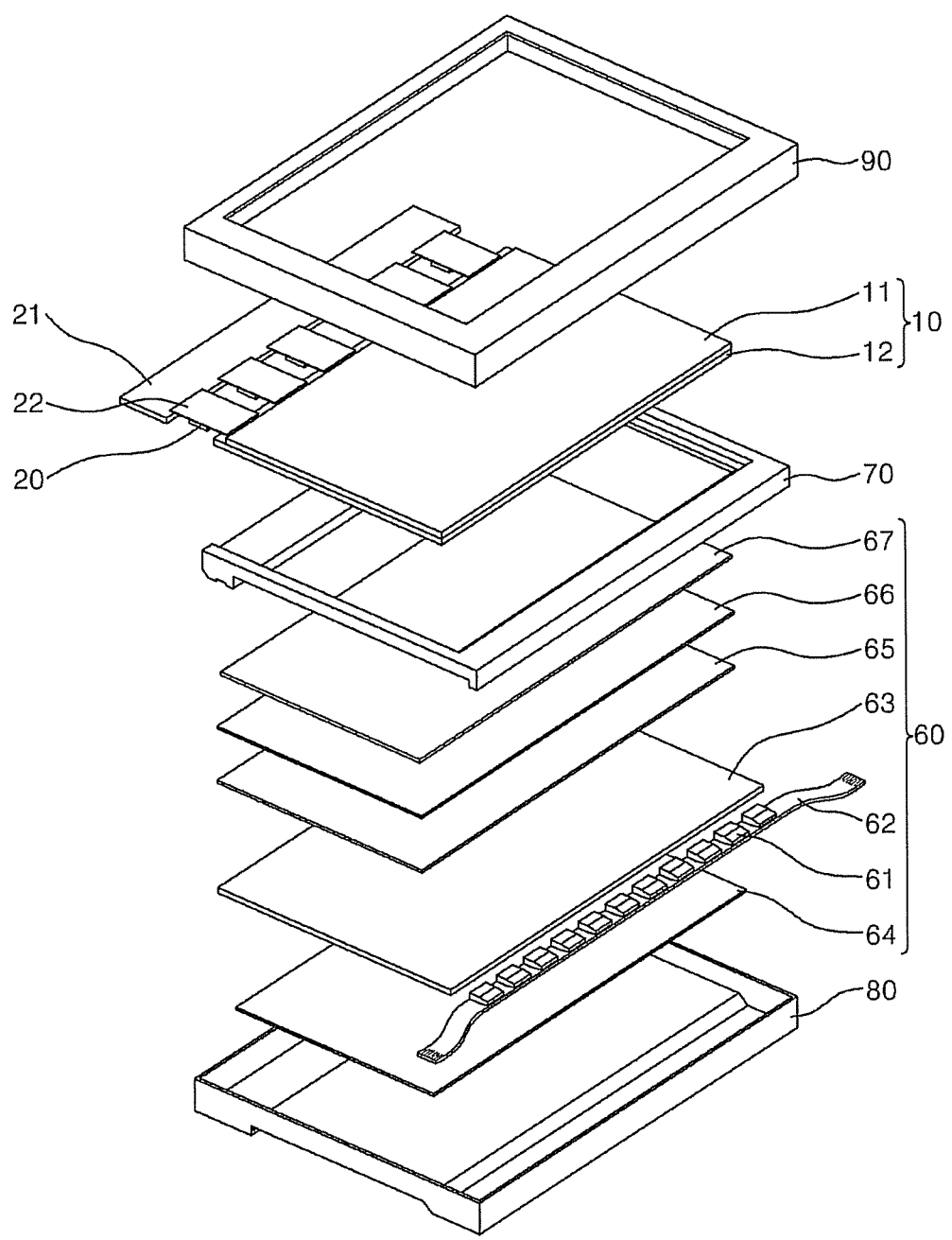
FIG. 1 is an exploded perspective view showing an exemplary LCD device in accordance with an exemplary embodiment of the present invention.

The present invention is described more fully hereinafter with reference to the accompanying drawings, in which exemplary embodiments of the invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
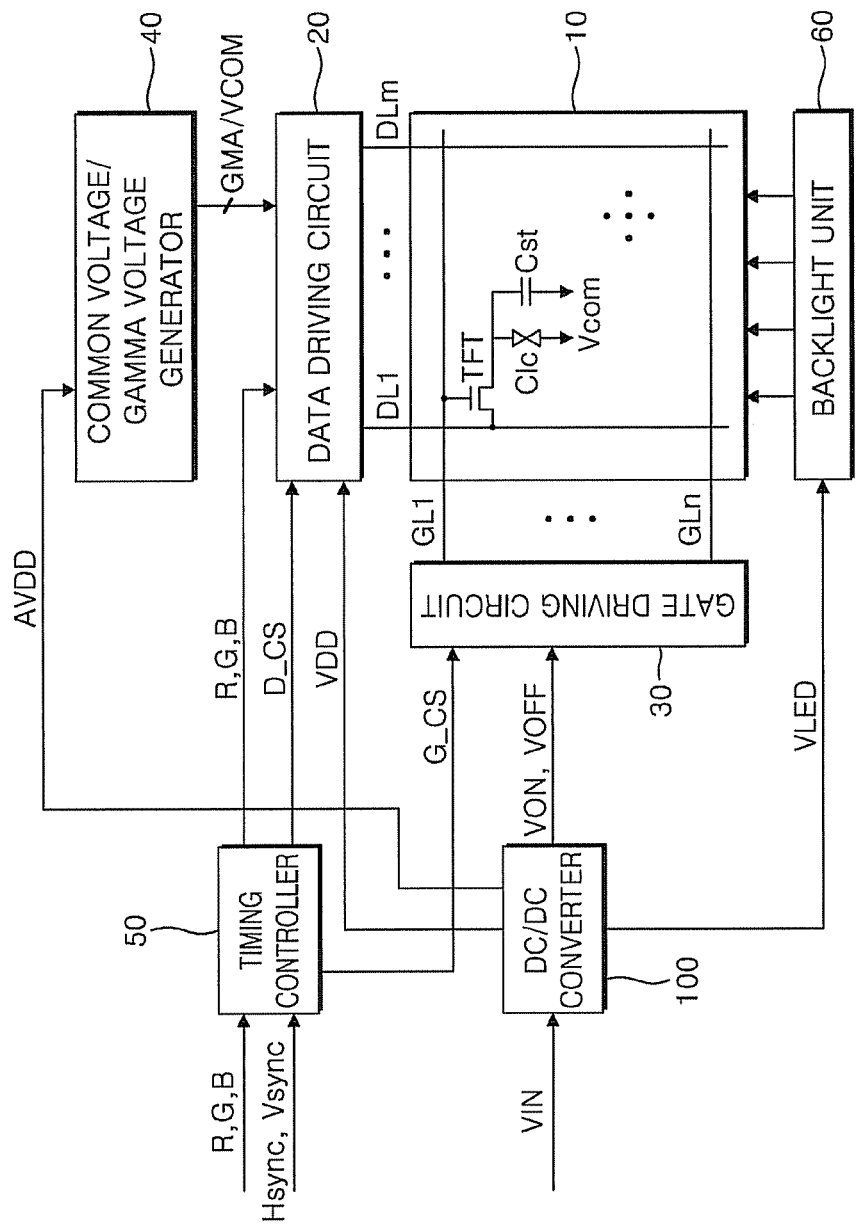
FIG. 2 is a block diagram schematically showing the exemplary LCD device in accordance with an exemplary embodiment of the present invention.

FIG. 1 is an exploded perspective view showing an exemplary LCD device in accordance with an exemplary embodiment of the present invention and FIG. 2 is a block diagram schematically showing the exemplary LCD device in accordance with an exemplary embodiment of the present invention.

Referring to FIGS. 1 and 2, the LCD device in accordance with an exemplary embodiment of the present invention includes an LCD panel 10 displaying an image, a gate driving circuit 30 driving a gate line GL of the LCD panel 10, a data driving circuit 20 driving a data line DL of the LCD panel 10, a timing controller 50 supplying an image data signal to the data driving circuit 20 and supplying a control signal to the gate driving circuit 30 and the data driving circuit 20, a common voltage/gamma voltage generator 40 generating a common voltage VCOM and a gamma voltage GMA, a backlight unit 60 supplying light to the LCD panel 10, and a DC-DC converter 100 generating a voltage which drives the gate driving circuit 30, the data driving circuit 20, the common voltage/gamma voltage generator 40, and the backlight unit 60, respectively.

More specifically, the LCD panel 10 includes a thin film transistor ("TFT") substrate 12, a color filter ("CF") substrate 11 facing the TFT substrate 12, and liquid crystal (not shown) disposed between the TFT substrate 12 and the CF substrate 11 and adjusting light transmission.

The TFT substrate 12 includes the gate line GL and the data line DL which are insulated from each other and extend in different directions so as to intersect each other, a TFT connected to the gate line GL and the data line DL in an area where the gate line GL and the data line DL intersect, a pixel electrode connected to the TFT, and a storage electrode storing a voltage charged in the pixel electrode.

The CF substrate 11 includes a black matrix which overlaps the gate line GL, the data line DL, and the TFT and prevents light leakage, a color filter formed to overlap a pixel area divided by the black matrix, and a common electrode which receives a common voltage VCOM.

Liquid crystal is disposed between the TFT substrate 12 and the CF substrate 11 and displays a gray level by rotating according to an electric field generated between the pixel electrode and the common electrode. A liquid crystal capacitance Clc formed between the pixel electrode and the common electrode and a storage capacitance Cst formed by overlapping a storage electrode and the pixel electrode maintain a pixel data voltage charged in the pixel electrode during one frame.

The timing controller 50 supplies pixel data signals R, G, and B input from an external circuit to the data driving circuit 20, and supplies a control signal to the gate driving circuit 30 and the data driving circuit 20. In other words, the timing controller 50 supplies the pixel data signals R, G, and B to the data driving circuit 20 according to a horizontal synchronization signal Hsync and a vertical synchronization signal Vsync. Further, the timing controller 50 generates a gate control signal G_CS including a gate start pulse, a gate shift clock, etc. and supplies the gate control signal G_CS to the gate driving circuit 30. The timing controller 50 also generates a data control signal D_CS including a data start pulse, a data shift clock, etc. and supplies the data control signal D_CS to the data driving circuit 20.

The common voltage/gamma voltage generator 40 generates a plurality of gamma voltages GMA with reference to an analog voltage AVDD from the DC/DC converter 100 and supplies the gamma voltages GMA to the data driving circuit 20. The common voltage/gamma voltage generator 40 also generates a common voltage VCOM and supplies the common voltage VCOM to the common electrode of the LCD panel 10. The common voltage/gamma voltage generator 40 generates a divided voltage by serially connecting a plurality of resistors between a base voltage and the analog voltage AVDD and extracting an output terminal between the serially-connected resistors.

The gate driving circuit 30 is connected to the gate line GL to sequentially supply the gate-on voltage VON to the gate line GL and to supply the gate-off voltage VOFF to the gate lines not receiving the gate-on voltage VON. The gate driving circuit 30 may be formed of an amorphous silicon gate ("ASG") when the TFT is formed within a non-display area of the TFT substrate 12, or may be formed of an integrated circuit ("IC") to be mounted on the TFT substrate 12 in the form of chip-on-glass ("COG"). Further, although not shown, the gate driving circuit 30 may be mounted on a flexible film in the form of a tape carrier package ("TCP") and connected to the LCD panel 10 in a manner similar to the connection of the data driving circuit 20 to the LCD panel 10 shown in FIG. 1.

When receiving the pixel data signals R, G, and B and the data control signal D_CS input from the timing controller 50, the data driving circuit 20 converts the pixel data signals R, G, and B into an analog signal through the gamma voltage GMA supplied from the common voltage/gamma voltage generator 40 and supplies the pixel data voltage converted into the analog signal to the data line, including data lines DL1 to DLm. The data driving circuit 20 may be formed of an IC to be mounted on the TFT substrate 12 as a COG, or may be formed of a data TCP to be connected to the TFT substrate 12. Herein, as shown in FIG. 1, the LCD panel 10 connected to the data driving circuit 20 formed on a flexible film 22 will now be described as an example. The flexible film 22 on which the data driving circuit 20 is mounted, i.e. a data TCP is affixed to a data printed circuit board ("PCB") 21.

The DC-DC converter 100, which will be further described below, and the timing controller 50 are mounted on the data PCB 21.

The backlight unit 60 includes a light source which generates light, a light guide plate 63 which guides the light supplied from the light source toward the LCD panel 10, a reflection sheet 64 which reflects the light supplied to the lower portion of the light guide plate 63 toward the light guide plate 63, and optical sheets including sheets 65, 66 and 67 disposed between the light guide plate 63 and the LCD panel 10 to improve efficiency of the light supplied from the light guide plate 63 to the LCD panel 10.

In the exemplary embodiment, the light source uses LEDs 61 having the characteristics of a fast lighting speed, long lifespan, low power-consumption, and high efficiency. The LEDs 61 are mounted on a light source substrate 62, aligned along one side of the light guide plate 63 to supply light to the light guide plate 63.

The light source substrate 62 is formed of a flexible printed circuit ("FPC") or a PCB. Further, both sides of the light source substrate 62 are extended to be connected to the DC-DC converter 100 except for an area where the LEDs 61 are mounted. Electrodes are formed on both ends of the light source substrate 62 and supply an LED driving voltage VLED from the DC-DC converter 100 to the LEDs 61. The light source substrate 62 emits heat generated from the LEDs 61. In other words, a metal pad conducting heat is formed within the light source substrate 62 and delivers heat generated from the LEDs 61 to an outer receiving member such as a bottom chassis 80, which will be described later.

The light guide plate 63 converts a point light source supplied from the LEDs 61 into a surface light source and guides the surface light source to the LCD panel 10. The light guide plate 63 has a light guide pattern therein so as to supply the light supplied to an incident surface toward an opposing side of the light guide plate 63 with uniform brightness. The light guide pattern may be formed of protrusions or grooves having a plurality of dots, or of a 'V' type cross-section of protrusions or grooves.

The reflection sheet 64 is formed on the lower portion of the light guide plate 63 and reflects the light supplied to the lower portion of the light guide plate 63 toward the light guide plate 63. The reflection sheet 64 may use a high reflectivity enhanced specular reflection sheet The optical sheets 65, 66, 67 are disposed between the light guide plate 63 and the LCD panel 10 and transmit the light emitted to the upper portion of the light guide plate 63 to the LCD panel 10. Since the optical sheets 65, 66, 67 vertically transmit the light supplied from the light guide plate 63 to the LCD panel 10, light efficiency is improved. The optical sheets 65, 66, 67 more particularly may include a diffusion sheet 65, a prism sheet 66, and a protection sheet 67.

The diffusion sheet 65 transmits the light from the light guide plate 63 to the front surface of the LCD panel 10, diffuses the light to uniformly distribute in a broad range, and transmits the light to the LCD panel 10. Preferably, the diffusion sheet 65 uses a film including a transparent resin with a light diffusion member coated on double sides.

The prism sheet 66 converts a moving angle of the light diffused by the diffusion sheet 65 so as to be perpendicular to the LCD panel 10. Light efficiency may be greatly improved when the light supplied to the LCD panel 10 is perpendicular to the LCD panel 10.

The protection sheet 67 protects the surface of the prism sheet 66, such as protection from scratches, and diffuses the light passing through the prism sheet 66.

While a particular backlight unit 60 has been described, it would be within the scope of these embodiments to provide the backlight unit 60 with an alternate number and arrangement of elements therein.

The backlight unit 60 is received within a mold frame 70. After the backlight unit 60 is received, the LCD panel 10 is secured on the upper portion of the protection sheet 67. The LCD panel 10 and the backlight unit 60 secured in the mold frame 70 are received within the bottom chassis 80 and firmly secured by a top chassis 90 covering the upper portion of the LCD panel 10, thus preventing damage of the LCD panel 10 and the backlight unit 60 by an outside physical impact.

The LCD device according to an exemplary embodiment of the present invention includes the DC-DC converter 100 which generates the gate-on voltage VON supplied to the gate driving circuit 30 and the LED driving voltage VLED supplied to the LEDs 61 of the backlight unit 60 in one circuit. Hereinafter, the DC-DC converter 100 will now be described in detail with reference to FIGS. 3 to 7.

Figure 3:
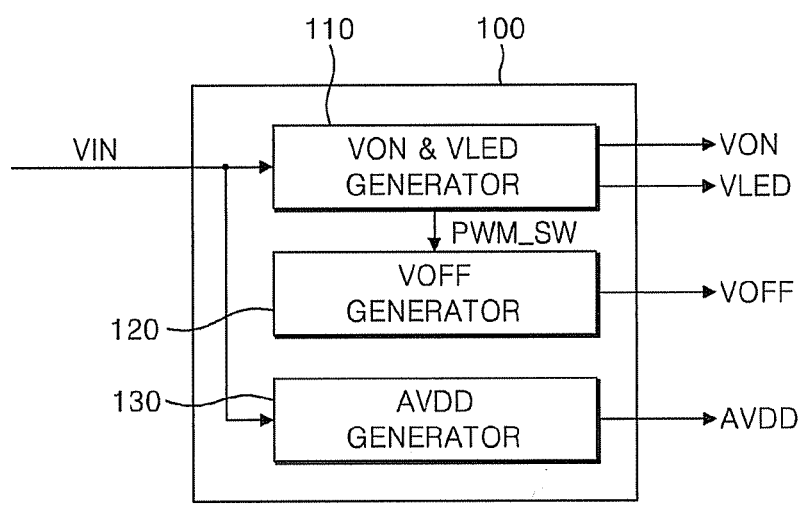
FIG. 3 is a block diagram schematically showing an exemplary DC-DC converter of the exemplary LCD device shown in FIG. 2.
Figure 4:
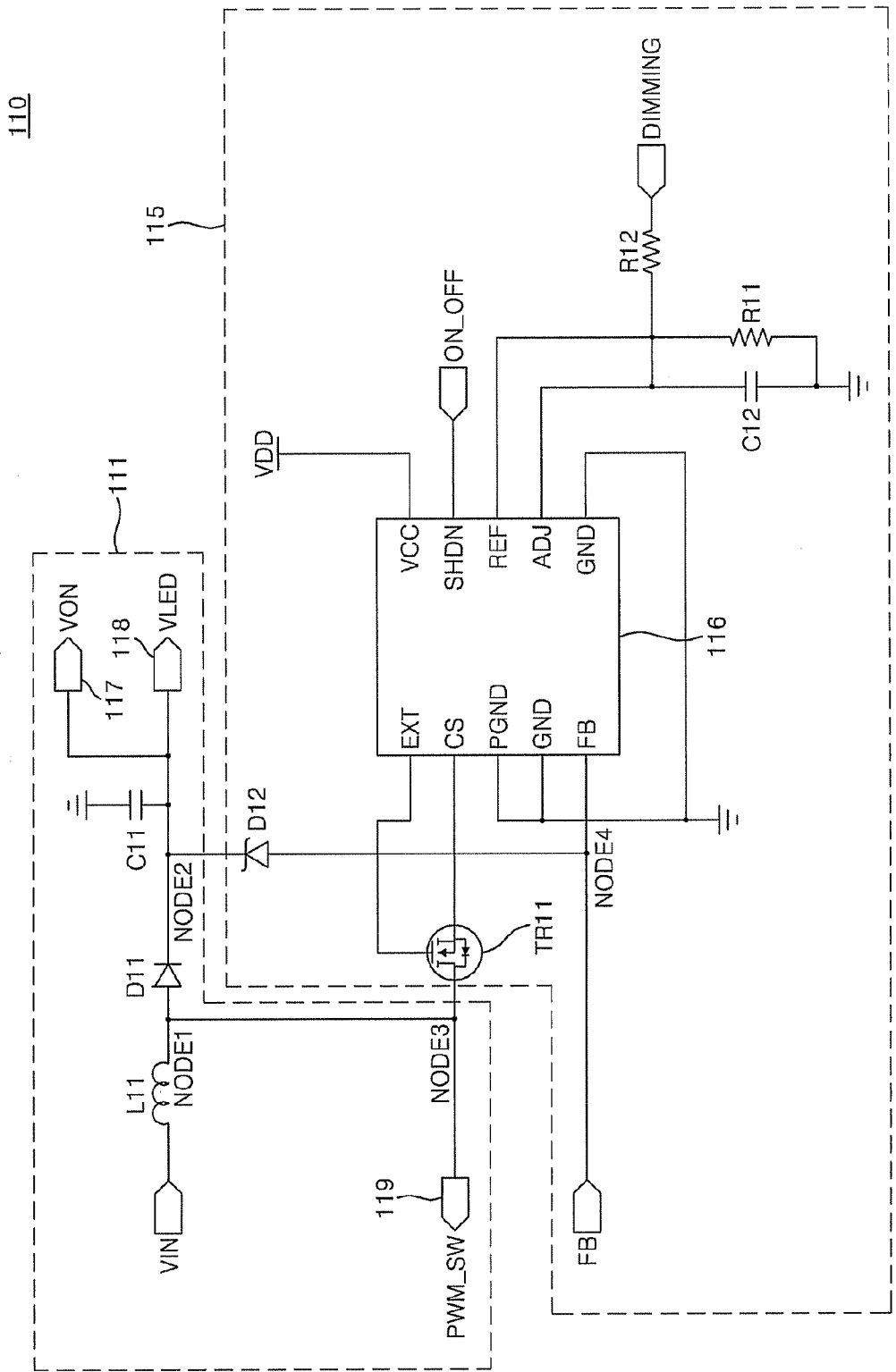
FIG. 4 is a circuit diagram showing a first exemplary embodiment of a gate-on voltage/LED driving voltage generator shown in FIG. 3.
Figure 5:
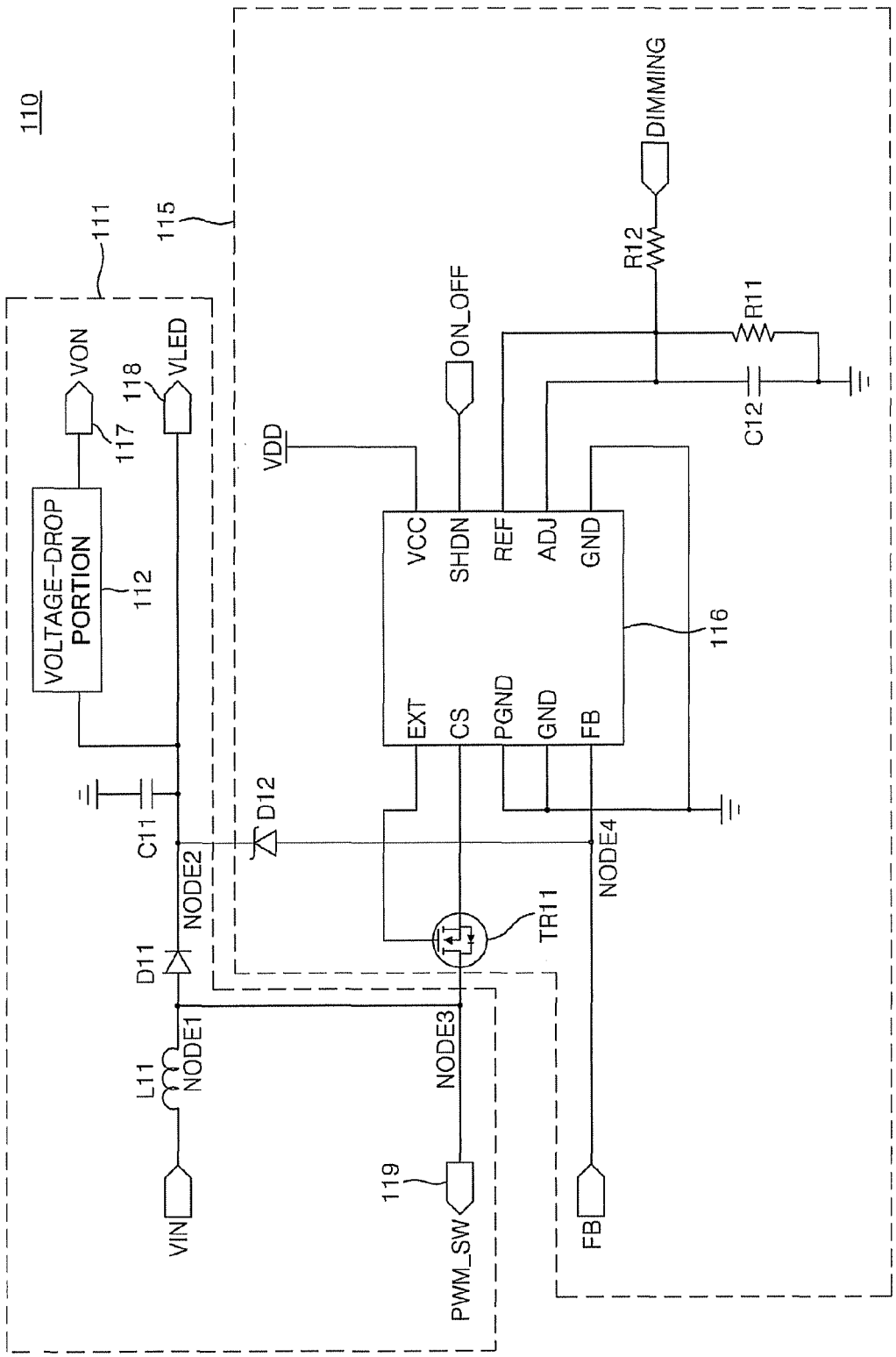
FIG. 5 is a circuit diagram showing a second exemplary embodiment of the gate-on voltage/LED driving voltage generator shown in FIG. 3.
Figure 6:
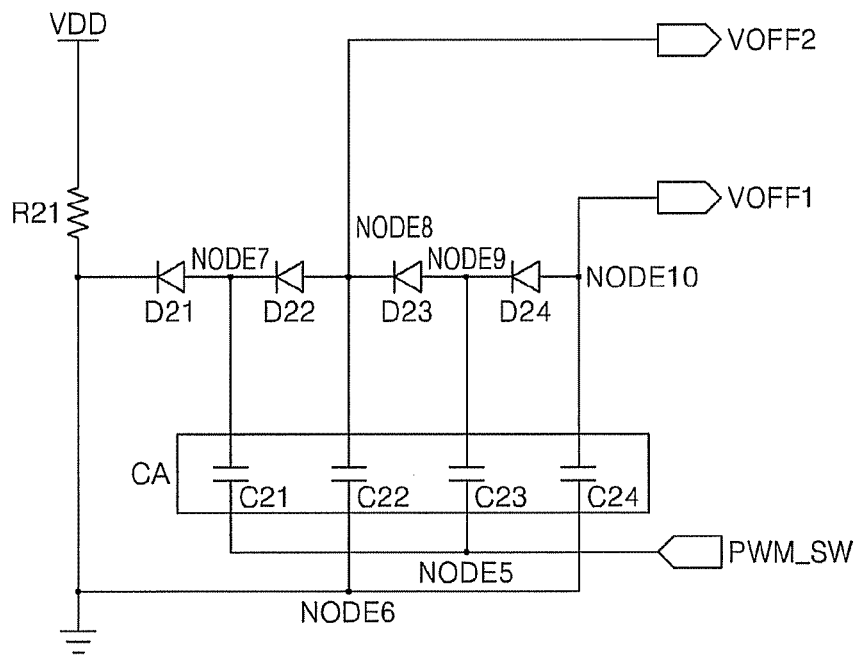
FIG. 6 is a circuit diagram showing an exemplary gate-off voltage generator shown in FIG. 3.
Figure 7:
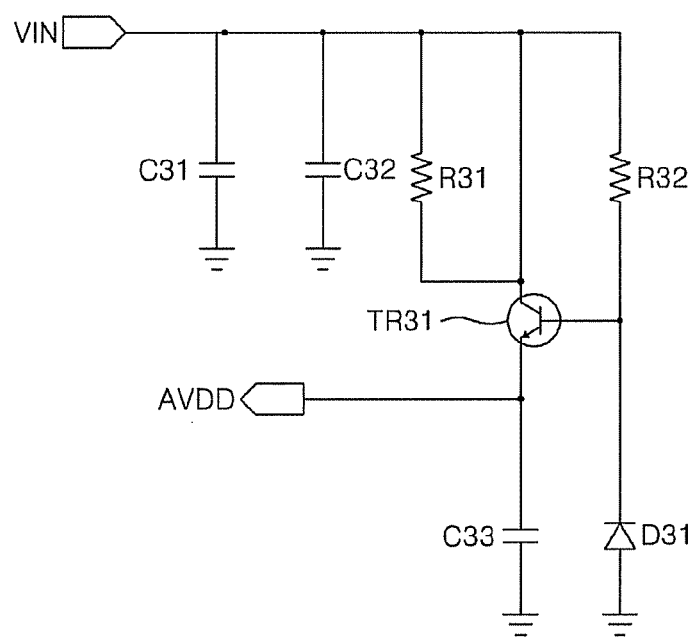
FIG. 7 is a circuit diagram showing an exemplary analog voltage generator shown in FIG. 3.

FIG. 3 is a block diagram schematically showing the exemplary DC-DC converter in accordance with an exemplary embodiment of the present invention shown in FIG. 2, FIG. 4 is a circuit diagram showing a first exemplary embodiment of a gate-on voltage/LED driving voltage generator of the exemplary DC-DC converter shown in FIG. 3, FIG. 5 is a circuit diagram showing a second exemplary embodiment of the gate-on voltage/LED driving voltage generator of the exemplary DC-DC converter shown in FIG. 3, FIG. 6 is a circuit diagram showing an exemplary gate-off voltage generator for the exemplary DC-DC converter shown in FIG. 3, and FIG. 7 is a circuit diagram showing an exemplary analog driving voltage generator for the exemplary DC-DC converter shown in FIG. 3.

Referring to FIG. 3, the DC-DC converter 100 includes a gate-on voltage/LED driving voltage generator 110, a gate-off voltage generator 120, and an analog voltage generator 130.

Referring to FIG. 4, in the first exemplary embodiment of the gate-on voltage/LED driving voltage generator shown in FIG. 3, the gate-on voltage/LED driving voltage generator 110 includes a boost voltage generator 111 and a stabilization circuit 115.

More specifically, the boost voltage generator 111 includes an inductor L11 which boosts a voltage through a pulse width modulation voltage PWM_SW and a first voltage VIN, a first diode D11 and a capacitor C11 which rectify the voltage boosted in the inductor L11, a first output terminal 118 which outputs the voltage rectified from the first diode D11 and the capacitor C11 and supplies the LED driving voltage VLED to the LEDs 61, and a second output terminal 117 divided from the first output terminal 118 to supply the rectified voltage to the gate driving circuit 30 as the gate-on voltage VON.

The pulse width modulation voltage PWM_SW is input from an external circuit, or supplied through a pulse width modulation ("PWM") circuit 116 of the stabilization circuit 115 which will be described later. The pulse width modulation voltage PWM_SW is a pulse voltage and swings in a range, such as, by example only, a range of from about 0V to about 8V. The first voltage VIN may be about 12V as a DC voltage supplied from an external power supply apparatus such as a battery or an external alternating current ("AC")/DC converter. At this time, the inductor L11 boosts the first voltage VIN by the PWM voltage PWM_SW. For example, the first voltage VIN of about 12V is boosted to about 25V. The first diode D11 and the capacitor C11 rectify the voltage output from the inductor L11. The voltage rectified from the first diode D11 and the capacitor C11 is supplied to the LEDs 61 through the first output terminal 118. Herein, the LEDs 61 are serially connected to one another and groups of the LEDs 61 serially connected may be connected in parallel. At this time, each of the LEDs 61 operates at, for example, about 3V and the LEDs 61 (e.g. the number of the LEDs may be 7) are serially connected to one another. Accordingly, the LED driving voltage VLED supplied to the serially connected LEDs 61 is equal to or higher than about 21V. The second output terminal 117 is divided from the first output terminal 118 and outputs the substantially same voltage as the LED driving voltage VLED supplied to the first output terminal 118. The voltage supplied from the second output terminal 117 is the gate-on voltage VON driving the gate line GL and is supplied to the gate driving circuit 30.

The stabilization circuit 115 includes the PWM circuit 116 which generates a signal controlling a current of the voltage supplied to the first output terminal 118 and the second output terminal 117, a second diode D12 disposed between the PWM circuit 116 and the first diode D11 and conducted when the voltage supplied to the first output terminal 118 and the second output terminal 117 is higher than a reference voltage to block a voltage supplied to the first output terminal 118 and the second output terminal 117, and a first transistor TR11 which is disposed between the PWM circuit 116 and the inductor L11 and which controls a current of the PWM voltage PWM_SW.

The PWM circuit 116 includes a voltage input terminal VCC which receives a power supply voltage VDD, a plurality of ground voltage terminals GND and PGND, a feedback terminal FB which receives a feedback voltage FB, transistor control terminals EXT and CS each connected to input and output terminals of the first transistor TR11 which controls a current, and a shut-down terminal SHDN which supplies a shut-down voltage ON-OFF to the PWM circuit 116. The PWM circuit 116 further includes a dimming control terminal ADJ for controlling dimming of the LEDs 61. Resistors R11 and R12 and the capacitor C12 connected to the dimming control terminal ADJ and applying the voltage of the dimming signal DIMMING are connected to the PWM circuit 116. Further, the PWM circuit 116 has a terminal REF receiving a reference voltage compared with the feedback voltage FB.

Herein, the levels of the gate-on voltage VON and the LED driving voltage VLED are controlled according to the dimming signal DIMMING input for controlling the dimming of the LEDs 61. In other words, when the dimming signal DIMMING is supplied to the PWM circuit 116, the PWM voltage PWM_SW output from the PWM circuit 116 varies with the dimming signal DIMMING. At this time, it is preferable that the level of the PWM voltage PWM_SW output from the PWM circuit 116 according to the dimming signal DIMMING maintains the level of the least gate-on voltage VON. Further, when brightness of the LEDs 61 is controlled according to an amount of a current of the LED driving voltage VLED from the first output terminal 118, the PWM circuit 116 varies an amount of a current while outputting a constant level of the PWM voltage PWM_SW according to the dimming signal DIMMING. In other words, the PWM circuit 116 outputs the PWM voltage PWM_SW with an amount of a current varied while constantly maintaining the level of the voltage. At this time, since power consumption by the gate-on voltage VON supplied to the LCD panel 10 from the second output terminal 117 is very small, the LED driving voltage VLED supplied to the LEDs 61 from the first output terminal 118 is not affected by the gate-on voltage VON. At this time, the first transistor TR11 may alternatively be included within the PWM circuit 116.

The second diode D12 is disposed between a second node NODE2 outputting the rectified voltage from the inductor L11 and the feedback terminal FB, and blocks a current supply into the feedback terminal FB when a normal voltage (i.e. a voltage less than a reference value) is applied. However, the second diode D12 is conducted when the voltage rectified from the first diode D11 from the inductor L11 is higher than a reference value, and thus the rectified voltage is not supplied to the second output terminal 117 and the first output terminal 118, and is instead supplied to the feedback terminal FB. The second diode D12 uses a Zener diode backwardly turned on. The second diode D12 is connected in parallel to the first transistor TR11 and the first and second output terminals 118 and 117 to prevent the LED driving voltage VLED and the gate-on voltage VON from being higher than a reference value. Accordingly, the present invention may prevent breakdown of an insulating layer disposed between the gate lines GL1 to GLn of the LCD panel 10 and signal lines overlapping the gate lines, and prevent over-voltage and over-current supplied to the LEDs 61.

The first transistor TR11 is connected to the transistor control terminals EXT and CS of the PWM circuit 116 to control a current of the LED driving voltage VLED via a third node NODE3 and a first node NODE1 using the feedback voltage FB after the LED driving voltage VLED operates the LEDs 61. Further, the first transistor TR11 supplies the PWM voltage PWM_SW to the gate-off voltage generator 120 of the DC/DC converter 100 through a third output terminal 119 connected to the third node NODE3.

FIG. 5 is a circuit diagram showing a second exemplary embodiment of the exemplary gate-on voltage/LED driving voltage generator of the exemplary DC-DC converter shown in FIG. 3.

FIG. 5 has substantially the same configurations as those of FIG. 4 except for the addition of a voltage-drop portion 112 which drops the level of the gate-on voltage VON included in the output terminal outputting the gate-on voltage VON. Accordingly, any repetitive description will be omitted.

Referring to FIG. 5, the gate-on voltage/LED driving voltage generator 110 for the DC-DC converter 100 further includes a voltage-drop portion 112 which drops the output voltage of the gate-on voltage VON at the output terminal 117 of the gate-on voltage VON.

The voltage-drop portion 112 is disposed between the second output terminal 117 and the first capacitor C11 using a resistor or a regulator. Accordingly, when the level of the gate-on voltage VON supplied to the second output terminal 117 rises, the voltage-drop portion 112 drops the gate-on voltage VON.

For example, when the number of the LEDs 61 is more than 10, the LED driving voltage VLED output from the first output terminal 118 should be higher than about 30V. Accordingly, the voltage output to the first output terminal 117 and the second output terminal 118 becomes higher than about 30V. However, when a voltage higher than about 30V is applied to the LCD panel 10, an insulating layer disposed between the gate lines GL1 to GLn and signal lines may be broken and thus failure of the LCD panel 10 may occur. Accordingly, in such a case, the voltage supplied to the gate driving circuit 30 at the second output terminal 117 should be maintained at about 25V. Accordingly, the voltage-drop portion 112 including a voltage-drop circuit, etc. such as a resistor or a regulator, etc. is formed in the second output terminal 117 to constantly maintain the gate-on voltage VON supplied to the gate lines GL1 to GLn at an acceptable level.

At this time, when the level of the voltage supplied to the second output terminal 117 is small, a boost circuit (not shown) may be further included. In other words, when the number of the LEDs 61 is small, the voltage supplied to the second output terminal 117 of a boost voltage generator 111 may be supplied with a voltage lower than a turn-on voltage of the TFT of the LCD panel 10. In this case, since a driving failure of the LCD panel 10 may occur, the boost circuit boosting the voltage supplied to the second output terminal 117 may be further included.

Next, the gate-off voltage generator 120 included in the DC-DC converter 100 shown in FIG. 6 will be described.

Referring to FIG. 6, the gate-off voltage generator 120 generates a negative DC voltage (i.e. a gate-off voltage VOFF) from the second input voltage PWM_SW using a charging pump CA, and supplies the gate-off voltage VOFF to the gate driving circuit 30. Herein, the second input voltage is the PWM voltage PWM_SW supplied from the third output terminal 119 of the gate-on voltage/LED driving voltage generator 110.

More specifically, the gate-off voltage generator 120 includes a diode portion with a plurality of diodes connected backwardly to one another between the second input voltage, which is the PWM voltage PWM_SW, and the output voltage, which is the gate-off voltage VOFF. The gate-off voltage generator 120 includes the charging pump CA which receives the PWM voltage PWM_SW. Output terminals of the charging pump CA are connected to the diodes D21, D22, D23 and D24, respectively. Herein, the second input voltage PWM_SW is a square wave which swings between a basic voltage and a high voltage. The charging pump CA supplies the voltage charged by the second input voltage PWM_SW which is applied to each of the capacitors C21 and C23 to a seventh node NODE7 and a ninth node NODE9, supplies the basic voltage charged in the capacitors C22 and C24 to an eighth node NODE8 and a tenth node NODE10, and generates the gate-off voltage VOFF. At this time, the diode portion is backwardly connected and generates a phase-inverted voltage with respect to the charged voltage. With regards to the gate-off voltage VOFF, the gate-off voltage generator 120 outputs a first gate-off voltage VOFF1 and a second gate-off voltage VOFF2 at the node NODE8 and the node NODE10, respectively. At this time, the first gate-off voltage VOFF1 is higher than the second gate-off voltage VOFF2. For example, when the second input voltage PWM_SW swinging in the range of from about 0V to about 8V is supplied, the first gate-off voltage VOFF1 is output as about −7V and the second gate-off voltage VOFF2 is output as about −14V. The first gate-off voltage VOFF1 is supplied to the gate driving circuit 30 and the second gate-off voltage VOFF2 is supplied to a certain circuit connected to a further circuit (e.g. the gate driving circuit 30 of a level shifter, etc.). As shown in FIG. 6, the resistor R21 disposed between the driving voltage VDD and the diode D21 has a very large resistance. Accordingly, the diode D21 is connected to the basic voltage from the second input voltage PWM_SW.

FIG. 7 is a circuit diagram showing an exemplary analog voltage generator in accordance with an exemplary embodiment of the present invention.

The analog voltage generator 130 includes voltage-drop resistors R31 and R32 which drop the first input voltage VIN and a second transistor TR31 which outputs the voltage dropped by the voltage-drop resistors R31 and R32. The first input voltage VIN, which is the same first input voltage VIN supplied to the gate-on voltage/LED driving voltage generator 110, supplies voltages stabilized by capacitors C31 and C32 connected in parallel to each other. The voltages dropped by the voltage-drop resistors R31 and R32 are applied to a base terminal and a collector terminal, respectively. When the first input voltage VIN is supplied, the second transistor TR31 is turned on to supply the analog voltage AVDD to the common voltage/gamma voltage generator 40. The analog voltage generator 130 may use a voltage-drop circuit such as a regulator, other than the voltage drop resistors R31 and R32 shown in the circuit diagram of FIG. 7.

The DC-DC converter 100 according to an exemplary embodiment of the present invention outputs a gate-on voltage VON in a same circuit generating the LED driving voltage VLED. Accordingly, a further additional circuit generating the gate-on voltage VON may be omitted, thus reducing costs.

Figure 8:
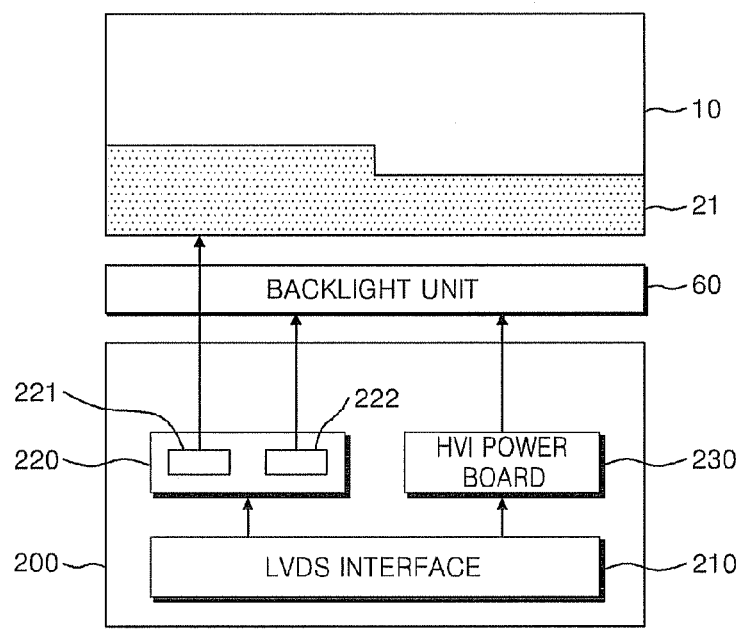
FIG. 8 is a block diagram schematically showing an exemplary aging test apparatus of the exemplary LCD device in accordance with an exemplary embodiment of the present invention.
Figure 9:
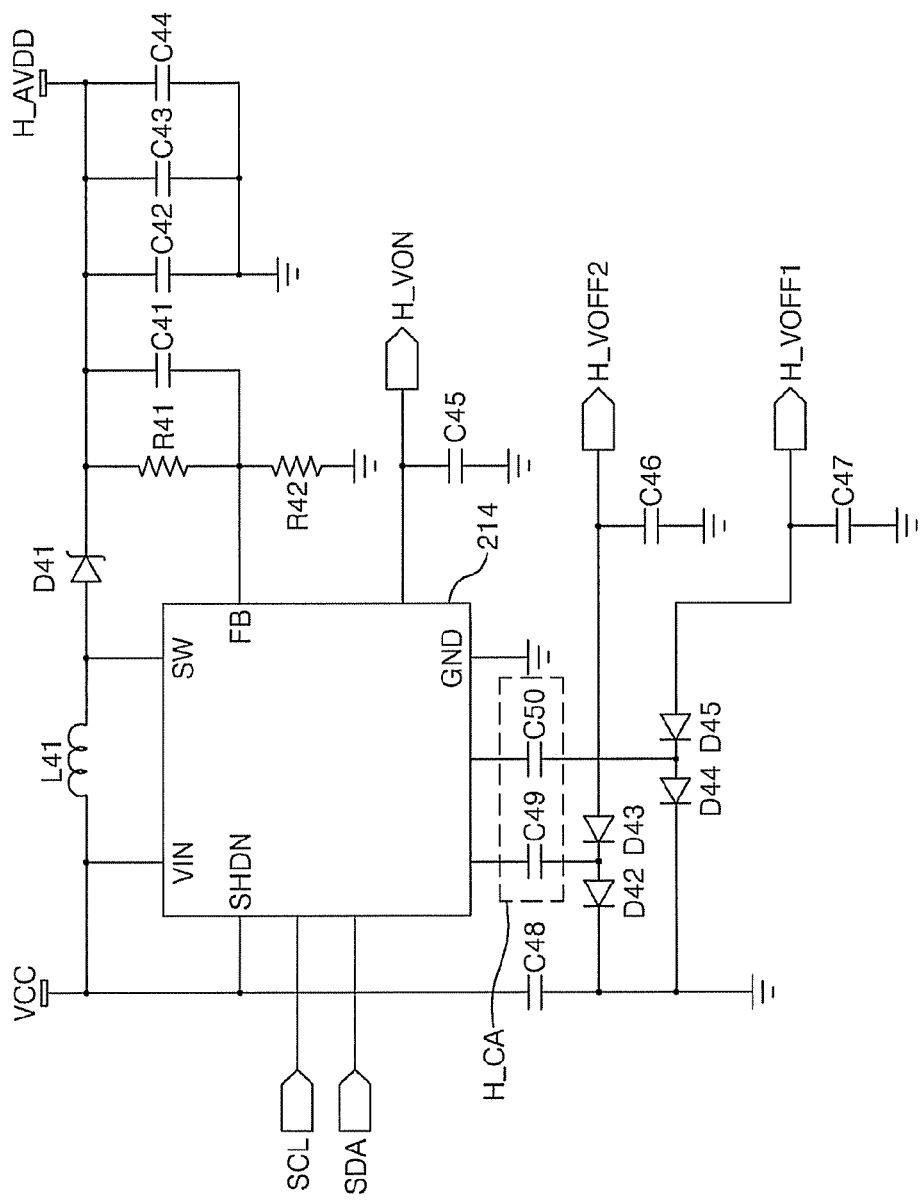
FIG. 9 is a circuit diagram showing an exemplary HVS driving voltage generator formed on an exemplary HVS power board shown in FIG. 8.
Figure 10:
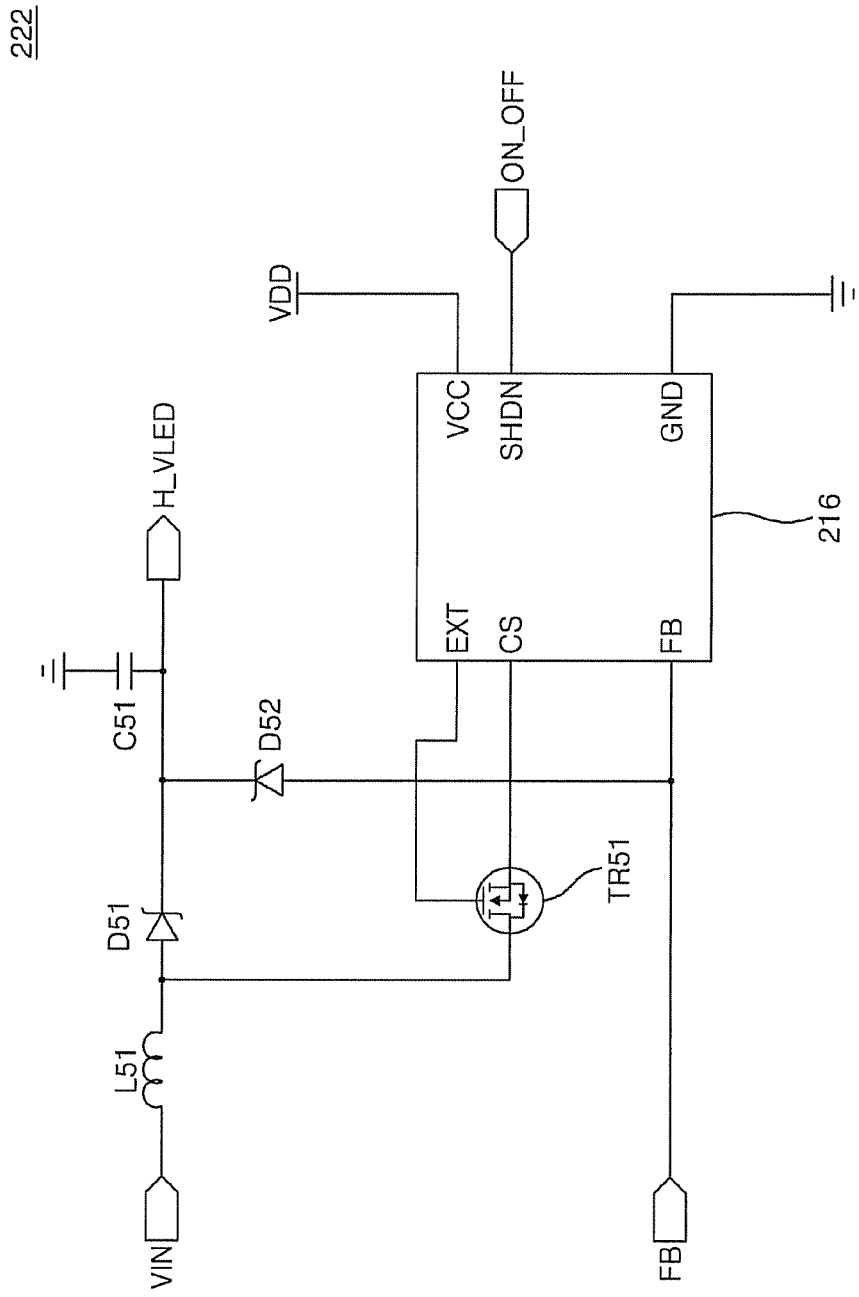
FIG. 10 is a circuit diagram showing an exemplary high LED driving voltage generator formed on the HVS power board shown in FIG. 8.

FIG. 8 is a block diagram schematically showing an exemplary aging test apparatus of the exemplary LCD device in accordance with an exemplary embodiment of the present invention, FIG. 9 is a circuit diagram showing an exemplary HVS driving voltage generator mounted on the exemplary HVS power board shown in FIG. 8, and FIG. 10 is a circuit diagram showing an exemplary high LED driving voltage generator mounted on the exemplary HVS power board shown in FIG. 8.

Referring to FIGS. 8 to 10, the aging test apparatus of the LCD device in accordance with an exemplary embodiment of the present invention includes an HVS power board 220, an HVI power board 230, and a low voltage differential signaling ("LVDS") interface 210 which supplies a driving signal, a control signal, and a data signal to the HVS power board 220 and supplies an inverter driving signal to the HVI power board 230. An aging test apparatus 200 for the LCD device supplies a PCB 21 connected to the LCD panel 10 with a high voltage driving signal.

More specifically, the HVS power board 220 supplies to the LCD device a plurality of HVS driving voltages (i.e. a high digital driving voltage H_VDD, a high analog driving voltage H_AVDD, a high gate-on voltage H_VON, a high gate-off voltage H_VOFF, and a high LED driving voltage H_VLED). The HVI power board 230 supplies a high inverter driving voltage H_VI to the LCD device, such as to the backlight unit 60. The LVDS interface 210 receives an image data signal and a control signal from an external element and supplies the image data signal and the control signal to the HVS power board 220. At this time, according to types of the backlight unit 60 of the LCD device, control signals which selectively drive a high LED driving voltage generator 222 of the HVS power board 220 or the HVI power board 230, are generated. However, the HVI power board 230 may be omitted if necessary.

Referring to FIG. 9, an HVS signal generator 221 includes a PWM circuit 214, a fourth diode D41 and capacitors C42, C43 and C44 which rectify a high voltage boosted by the PWM circuit 214 and an inductor L41, an output terminal which outputs a voltage rectified from the fourth diode D41 and the capacitors C42, C43 and C44 as a high analog voltage H_AVDD, resistors R41 and R42 and a capacitor C41 which feedback the boosted high voltage, an output terminal which outputs the high gate-on voltage H_VON, a second charging pump H_CA which outputs the high gate-off voltage H_VOFF, and the diodes D42, D43, D44, and D45 connected to the second charging pump H_CA.

The high analog voltage H_AVDD is boosted in the inductor L41 boosting an input voltage and rectified by the fourth diode D41 and the capacitors C42, C43 and C44. The fourth diode D41 is connected to an output terminal of the PWM circuit 214 to rectify the boosted voltage. The capacitor C41 is disposed between the fourth diode D41 and a ground level voltage to stabilize the voltage output from the fourth diode D41.

The high gate-on voltage H_VON is generated within the PWM circuit 214 and stabilized by the capacitors C42, C43 and C44 connected in parallel to the output terminal outputting the high gate-on voltage H_VON.

The PWM voltage PWM_SW supplied by swinging between the base voltage and the high voltage supplied from the PWM circuit 214 is supplied to the second charging pump H_CA, and a voltage charged in the second charging pump H_CA is supplied to the diodes D42, D43, D44, and D45 serially connected backwardly to each other and rectified, thus outputting the high gate-off voltage H_VOFF. At this time, as shown in FIG. 9, a first high gate-off voltage H_VOFF1 is generated by the capacitor C50 formed in the second charging pump H_CA and the diodes D44 and D45 connected to the second charging pump H_CA. A second high gate-off voltage H_VOFF2 lower than the first high gate-off voltage H_VOFF1 is generated by the capacitor C49 and the diodes D42 and D43 connected to the capacitor C49. Output terminals outputting the first high gate-off voltage H_VOFF1 and the second high gate-off voltage H_VOFF2 are respectively connected to capacitors C47 and C46 connected to the base voltage to stabilize the high gate-off voltages H_VOFF1 and H_VOFF2.

FIG. 10 is a circuit diagram showing the exemplary high LED driving voltage generator 222 of the exemplary HVS power board 220 shown in FIG. 8.

The high LED driving voltage generator 222 includes a second PWM circuit 216 which supplies the PWM voltage PWM_SW, an inductor L51 which boosts an input voltage VIN supplied from the second PWM circuit 216 and an input terminal, a fifth diode D51 which rectifies the voltage boosted in the inductor L51, an output terminal which outputs the voltage rectified from the fifth diode D51 as the high LED driving voltage H_VLED. The high LED driving voltage generator 222 also includes a sixth diode D52 which is connected between the second PWM circuit 216 and the fifth diode D51 and is conducted when a voltage supplied to the output terminal is higher than a reference value to block a voltage supplied to the output terminal. Herein, the second PWM circuit 216 supplies the second PWM voltage PWM_SW to a node between the inductor L51 and the fifth diode D51 through a fifth transistor TR51.

The high LED driving voltage generator 222 generates the high LED driving voltage H_VLED by being boosted in the inductor L51 through the input voltage VIN and the PWM voltage PWM_SW supplied from the fifth transistor TR51 and then rectified through the fifth diode D51 and the capacitor C51. At this time, a voltage boosted to be higher than the reference value is supplied to the feedback terminal FB of the second PWM circuit 216 through the sixth diode D52 which is connected backwardly between the fifth diode D51 and the feedback terminal FB, thereby controlling the output level of the high LED driving voltage H_VLED.

Referring back to FIG. 8, the HVI power board 230 generates the high inverter driving voltage H_VI through a boost circuit boosting the input voltage when the driving voltage is input, and supplies the high inverter driving voltage H_VI to the inverter of the LCD device.

The LVDS interface 210 supplies the pixel data signal and the control signal applied from an external circuit by an LVDS communication method to the LCD device, and supplies a driving signal to the HVS power board 220. Further, the LVDS interface 210 selectively supplies the driving signal to the HVI power board 230, and selectively drives the HVI power board 230.

In an aging test of the LCD device, when the light source of the backlight unit 60 of the LCD device is an LED, the high LED driving voltage H_VLED is supplied through the high LED driving voltage generator 222. When the light source of the backlight unit 60 is a lamp, the high inverter driving voltage H_VI is supplied to the inverter driving the lamp by operating the HVI power board 230. In other words, when the light source of the backlight unit 60 of the LCD device is a lamp, since the high LED driving voltage generator 222 need not operate, it shuts down the second PWM circuit 216 of the high LED driving voltage generator 222 and does not supply the input voltage VIN supplied to the high LED driving voltage generator 222 from the LVDS interface 210.

Accordingly, the present invention may perform an aging test of the LCD device regardless of the type of backlight unit of the LCD device.

As described the above, the DC-DC converter and the LCD device having the same according to the present invention supply the gate-on voltage and the LED driving voltage by a single driving circuit, thus reducing the number of the driving circuits and costs.

Further, the present invention may reduce costs and simplifies configuration of the driving circuit by removing the PWM circuit used in the analog voltage generator.

Further, the aging test apparatus of the LCD device includes the high LED driving voltage generator in the HVS power board, and when the backlight unit of the LCD device is an LED, the aging test may be easily performed. Further, even if the light source of the backlight unit of the LCD device is a lamp, the LCD device may be performed by the same aging test apparatus by selectively operating the HVI power board.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display device comprising:
a liquid crystal display panel which displays an image;
a gate driving circuit and a data driving circuit which drive the liquid crystal display panel;
a timing controller which supplies a pixel data signal to the data driving circuit, and supplies a control signal to the gate driving circuit and the data driving circuit;
a common voltage/gamma voltage generator which generates a gamma voltage supplied to the data driving circuit and a common voltage supplied to the liquid crystal display panel;
a light emitting diode which supplies light to the liquid crystal display panel; and
a DC-DC converter comprising a gate-on voltage/light emitting diode driving voltage generator which receives a first input voltage, simultaneously generates a light emitting diode driving voltage and a gate-on voltage based on the first input voltage and a pulse width modulation voltage, supplied to the light emitting diode and the gate driving circuit, respectively, and outputs the pulse width modulation voltage; a gate-off voltage generator which receives the pulse width modulation voltage and generates a gate-off voltage supplied to the gate driving circuit; and an analog voltage generator which receives the first input voltage and generates an analog voltage supplied to the common voltage/gamma voltage generator,
wherein the gate-on voltage/light emitting diode driving voltage generator comprises:
an inductor which boosts the pulse width modulation voltage through the pulse width modulation voltage and the first input voltage
a first diode and a capacitor which rectify the voltage boosted in the inductor to provide a rectified voltage
a first output terminal which outputs the rectified voltage from the first diode and the capacitor to supply the light emitting diode driving voltage to the light emitting diode; and
a second output terminal which is divided from the first output terminal to supply the rectified voltage as the gate-on voltage to the gate driving circuit wherein a connection between the first output terminal and the second output terminal is directly connected to the first capacitor.

2. The liquid crystal display device of claim 1, wherein the gate-on voltage/light emitting diode driving voltage generator further comprises a stabilization circuit which constantly maintains a voltage level supplied to the first output terminal and the second output terminal.

3. The liquid crystal display device of claim 2, wherein the stabilization circuit further comprises
a pulse width modulation circuit which generates a signal controlling a current of the voltage supplied to the first output terminal and the second output terminal;
a second diode which is connected between the pulse width modulation circuit and the first diode and is conducted when the voltage supplied to the first output terminal and the second output terminal is higher than a reference voltage to block the voltage supplied to the first output terminal and the second output terminal; and
a first transistor connected between the pulse width modulation circuit and the inductor to supply the pulse width modulation voltage to the first diode.

4. The liquid crystal display device of claim 3, wherein the second output terminal further comprises a voltage-drop portion which drops the rectified voltage.

5. The liquid crystal display device of claim 3, wherein the pulse width modulation circuit further comprises a terminal which receives a feedback voltage from the light emitting diode, and controls levels of the light emitting diode driving voltage and the gate-on voltage supplied respectively to the first output terminal and the second output terminal.

6. The liquid crystal display device of claim 5, wherein the pulse width modulation circuit receives a dimming signal which controls brightness of the light emitting diode.

7. The liquid crystal display device of claim 3, wherein the gate-off voltage generator comprises
- a charging pump which charges the pulse width modulation voltage; and
- a diode portion which outputs a phase-inverted voltage with respect to the voltage charged in the charging pump,
- wherein the second input voltage is supplied through an output terminal of the first transistor.

8. The liquid crystal display device of claim 1, wherein the analog voltage generator comprises:
- a voltage-drop resistor which drops a first input voltage; and
- a transistor which outputs the voltage dropped by the voltage-drop resistor.

* * * * *